Jan. 12, 1943. A. L. PARKER 2,308,300
VALVE ASSEMBLY
Filed March 31, 1941
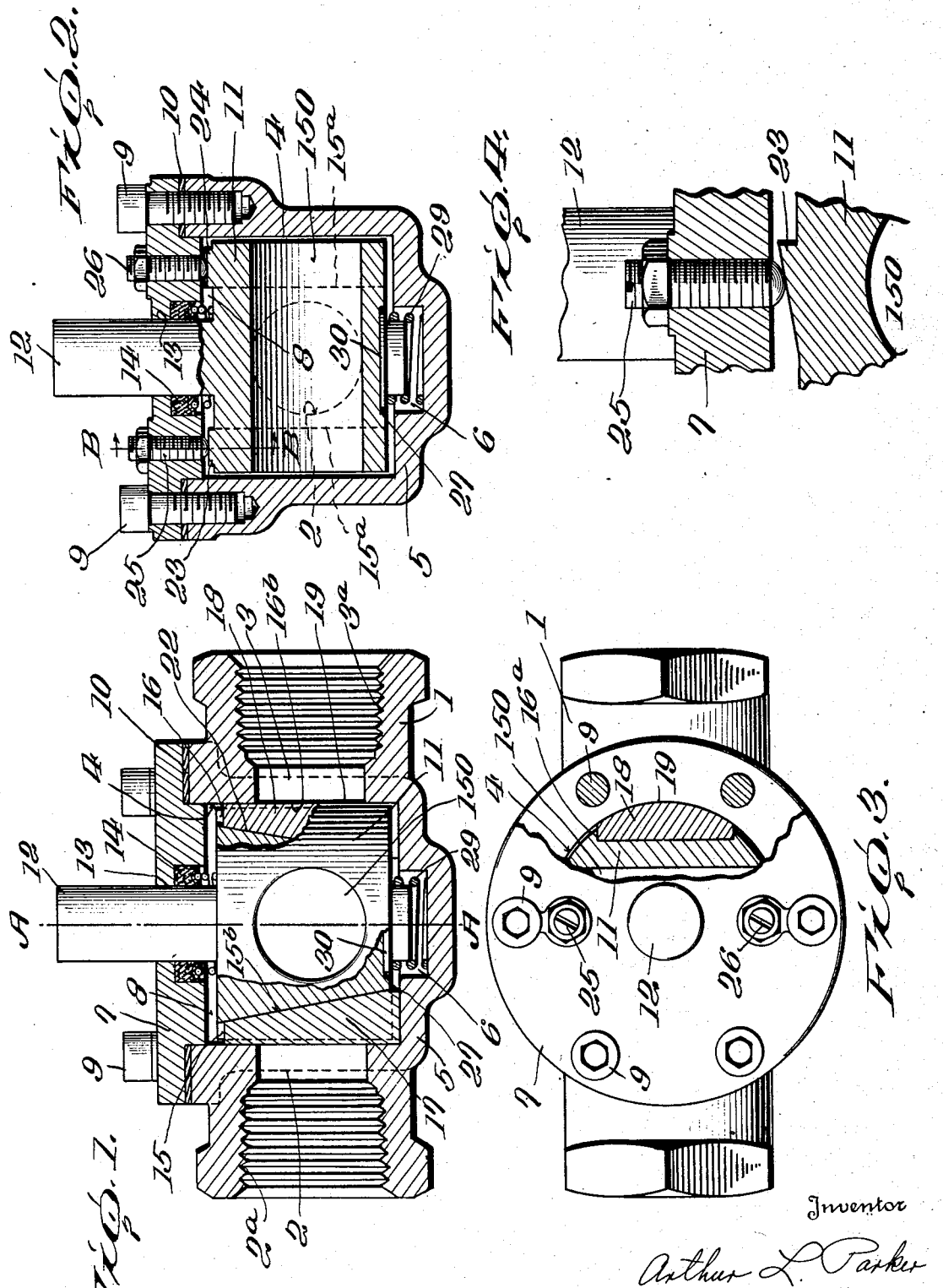
Inventor
Arthur L. Parker
By
Mason & Porter
Attorneys Patented Jan. 12, 1943

2,308,300

UNITED STATES PATENT OFFICE 2,308,300

VALVE ASSEMBLY

Arthur L. Parker, Cleveland, Ohio

Application March 31, 1941, Serial No. 386,214

3 Claims. (Cl. 251—97)

This invention relates to new and useful improvements in valves, particularly to that type of valve which includes a rotary plug for controlling the passage of fluid therethrough.

An object of the invention is to provide a valve of the above type wherein the plug includes an insert for closing off a port through the valve casing.

Another object is to provide a valve wherein the plug holds the insert tightly seated by a wedge action when the latter is in position for closing off a port.

A further object is to provide a valve in which an adjustable cam action automatically causes the plug to wedge a valve insert tightly against a port for sealing the same when the plug is rotated to the correct position for closing the port. In the drawing:

Fig. 1 is a side view, in section, showing the valve mechanism.

Fig. 2 is a vertical section taken through the line A—A of Fig. 1.

Fig. 3 is a plan view with a cutaway portion showing a valve insert.

Fig. 4 is a partial view, in section, taken along the line B—B of Fig. 2.

As shown in the drawing, the valve casing is provided with at least a pair of ports 2 and 3, and the usual threaded extensions 2a and 3a to which may be connected suitable conduits. The valve casing 1 also includes a cylindrical bore 4 which is open at one end and closed at the other by a wall portion 5 having a centrally located recess 6. A closure plate 7 is provided for closing the open end of the bore 4 to define a valve chamber 8 and is secured to the valve casing by bolts 9. The usual gasket 10 is provided for sealing against leakage.

Rotatably mounted within the valve chamber 8 is a plug 11 having an operating shaft 12 projecting through a bore 13 in the closure plate 7. A suitable handle (not shown) may be attached to the operating shaft 12 for enabling the plug to be rotated. A conventional spring pressed packing 14 seals against leakage around the operating shaft 12.

The plug 11 includes a transverse bore 150 extending therethrough which in one setting of the plug is adapted to establish communication between ports 2 and 3 for enabling the passage of fluid through the valve. The plug also includes diametrically opposed cut out portions 15 and 16 extending longitudinally thereof. The cutout portions 15 and 16 are formed with parallel side walls 15a, 16a, and inclined inner wall portions 15b and 16b. Slidably mounted within the cutout portions 15 and 16 are valve inserts 17 and 18. The outer surfaces 19, 20 of the inserts 17, 18 are curved to fit the cylindrical wall 4 of the valve chamber 8 and the inner surfaces 21, 22 are inclined so as to coincide with the inclined walls 15b, 16b of the cutouts 15, 16 respectively.

At the upper end of the valve operating member there are spaced cams 23 and 24. Mounted in the valve casing is an adjustable screw 25 which projects into the valve casing and is adapted to be contacted with by one of the cams 23 or 24. Also threaded into the valve casing at the upper end thereof is an adjustable screw 26 which likewise projects into the valve chamber and is adapted to cooperate with the other cam. The valve operating member is provided with a central recess 27 in the lower end thereof. The bottom wall of the valve casing is provided on its inner face with a similar recess 28. Located in the recesses is a spring 29. A wear plate 30 is placed in the recess 27.

When the valve is in the position shown in Figures 1 and 2, the ports are closed. At this time the cams 23 and 24 have been moved into engagement with the screws 25 and 26 respectively. As the cams wedge underneath these screws the actuating plug portion of the valve is forced downwardly and this will cause the inclined surfaces 15—b and 16—b contacting with the inclined surfaces of the valve inserts 19 and 20 to force said inserts outwardly into tight sealing contact with the valve casing in the region surrounding the ports. When it is desired to open the valve the first turning movement of the actuating member will release the cams 23 and 24 from engagement with the pins 25 and 26 and the spring 29 will raise the actuating member slightly thus releasing the pressure of the actuating member against the inserts. This permits the valve to be easily turned to full open position with the port 15 therethrough in alignment with the ports in the valve casing.

It is obvious that minor changes may be made in the valve structure without departing from the spirit of the invention as set forth in the appended claims.

I claim:

1. The combination of a valve casing providing a chamber with oppositely disposed ports, a valve carrying member mounted for rotation and endwise movement in the chamber, said valve carrying member having a passage therethrough adapted to be brought into alignment with said ports, said valve carrying member having diametrically opposed recesses formed therein the inner walls of which are inclined to the axis of the valve, said recesses being disposed intermediate the ends of the passage through the valve carrying member, valve inserts mounted in said recesses and having their inner faces inclined to conform to the inclination of the recesses, a cam means disposed between the upper end of the valve carrying member and the valve casing for moving the valve carrying member endwise when the valve inserts are moved to close the ports for pressing said inserts against the valve casing, and a spring means disposed between the lower end of said valve carrying member and said valve casing for moving the valve carrying member endwise in the opposite direction for releasing said valve inserts when the valve carrying member is turned to bring the passage into alignment with the ports.

2. The combination of a valve casing providing a chamber with oppositely disposed ports, a valve carrying member mounted for rotation and endwise movement in the chamber, said valve carrying member having a passage therethrough adapted to be brought into alignment with said ports, said valve carrying member having diametrically opposed recesses formed therein the inner walls of which are inclined to the axis of the valve, said recesses being disposed intermediate the ends of the passage through the valve carrying member, valve inserts mounted in said recesses and having their inner faces inclined to conform to the inclination of the recesses, cams mounted on the upper end of said valve and moving therewith, adjustable pins mounted in the valve casing and projecting into the valve chamber, said pins being disposed so that the cams will contact therewith when the inserts are moved to close the ports for forcing the valve carrying member endwise and pressing said inserts against the valve casing, and a spring means disposed between the lower end of the valve carrying member and the casing for moving said valve carrying member in the opposite direction when the cams are moved out of contact with the pins for releasing the inserts.

3. The combination of a valve casing providing a chamber with oppositely disposed ports, a valve carrying member mounted for rotation and endwise movement in said chamber, said valve carrying member having a passage therethrough adapted to be brought into alignment with said ports, said valve carrying member having diametrically opposed recesses formed therein the inner walls of which are inclined to the axis of the valve, said recesses being disposed intermediate the ends of the passage through the valve carrying member, valve inserts mounted in said recesses and having their inner faces inclined to conform to the inclination of the recesses, a cam means for moving the valve carrying member endwise, when the valve inserts are moved to close the ports, for pressing said inserts against the valve casing, said cam means being adjustable for varying the endwise set position of the valve carrying member to take up wear and insure a tight seating of the valves when the valve carrying member has been turned through a predetermined angle from open position.

ARTHUR L. PARKER.